US008732852B2

(12) United States Patent
Shu et al.

(10) Patent No.: US 8,732,852 B2
(45) Date of Patent: May 20, 2014

(54) METHOD, SYSTEM AND APPARATUS FOR PROTECTING SERVICE ACCOUNT

(75) Inventors: Qi Shu, Shenzhen (CN); Jieping Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 900 days.

(21) Appl. No.: 11/939,858

(22) Filed: Nov. 14, 2007

(65) Prior Publication Data

US 2008/0066190 A1 Mar. 13, 2008

Related U.S. Application Data

(63) Continuation of application No. PCT/CN2006/002537, filed on Sep. 26, 2006.

(30) Foreign Application Priority Data

Dec. 13, 2005 (CN) .......................... 2005 1 0134640

(51) Int. Cl.
*H04L 29/06* (2006.01)
*G06F 21/31* (2013.01)

(52) U.S. Cl.
CPC ................ *G06F 21/31* (2013.01); *H04L 63/10* (2013.01)
USPC ................................ 726/28; 726/18; 713/156

(58) Field of Classification Search
USPC ..................... 726/18, 28; 713/156; 709/229
See application file for complete search history.

(56) References Cited

U.S. PATENT DOCUMENTS

| 5,748,890 | A | 5/1998 | Goldberg et al. | |
| 6,691,232 | B1 * | 2/2004 | Wood et al. | 726/18 |
| 6,700,960 | B1 | 3/2004 | Kaufman et al. | |
| 7,216,361 | B1 | 5/2007 | Roskind et al. | |
| 2002/0023059 | A1 * | 2/2002 | Bari et al. | 713/156 |
| 2004/0034799 | A1 * | 2/2004 | Mikami | 713/201 |

FOREIGN PATENT DOCUMENTS

| CN | 1452735 A | 10/2003 |
| GB | 2369543 A | 5/2002 |
| JP | 2003-16286 A | 1/2003 |
| JP | 2003-132022 A | 5/2003 |

(Continued)

OTHER PUBLICATIONS

1st Office Action in corresponding Indian Patent No. 2774/CHENP/2008 (Feb. 1, 2013).

(Continued)

*Primary Examiner* — Brandon Hoffman
*Assistant Examiner* — Thong Truong
(74) *Attorney, Agent, or Firm* — Leydig, Voit & Mayer, Ltd.

(57) ABSTRACT

A method for protecting a service account includes: configuring association information for a service account of a user in a Personal Communication Profile (PCP) of the user at a network side; authenticating the association information when the user logs on an application server with the service account through User Equipment (UE); allowing the user to log on the application server if the authentication succeeds. Embodiments of the present invention also disclose systems, PCP storage apparatuses and application servers for protecting the service account. In embodiments of the present invention, besides protecting the service account by a static password, the user can implement an enhanced protection for the service account without receiving the dynamic password through a short message, which dramatically reduces the time delay for the user to log-on the application server. Further, the user needs not purchase the password card additionally. Therefore, the competitiveness of the application server is improved.

7 Claims, 6 Drawing Sheets

(56) References Cited

FOREIGN PATENT DOCUMENTS

| | | |
|---|---|---|
| JP | 2004-128886 A | 4/2004 |
| JP | 2004-510215 A | 4/2004 |
| JP | 2005-519365 A | 6/2005 |
| JP | 2005-519501 A | 6/2005 |
| JP | 2005-323070 A | 11/2005 |
| JP | 2007-521585 A | 8/2007 |
| JP | 2008-544737 A | 12/2008 |
| WO | 01/90859 A | 11/2001 |
| WO | WO0190859 A1 * | 11/2001 |

OTHER PUBLICATIONS

Written Opinion of the International Searching Authority in corresponding PCT Application No. PCT/CN2006/002537 (Feb. 1, 2007).

1st Office Action in corresponding Chinese Application No. 200510134640.2 (Apr. 17, 2009).

1st Office Action in corresponding Japanese Application No. 2008-544737 (May 31, 2011).

International Search Report in corresponding PCT Application No. PCT/CN2006/002537 (Feb. 1, 2007).

* cited by examiner

METHOD, SYSTEM AND APPARATUS FOR PROTECTING SERVICE ACCOUNT

This application is a continuation of International Patent Application No. PCT/CN2006/002537, filed Sep. 26, 2006, which claims priority to Chinese Patent Application No. 200510134640.2, filed Dec. 13, 2005, both of which are hereby incorporated by reference.

FIELD OF THE INVENTION

The present invention relates to network service authentication technologies, and particularly, to methods and systems for protecting a service account, apparatuses for storing a Personal Communication Profile (PCP), and application servers.

BACKGROUND OF THE INVENTION

At present, industry chain mode of the Internet has gradually stepped into an age that applications are the great from the past age when access and attention are the great. Content providers have gradually occupied a core status in the whole industry chain. Along with various applications provided by the content providers, many problems are also brought out. For example, phenomena such as Trojan horse and stealing of service account seriously affect normal operation of the network game. In order to restrict the phenomena, network game providers provide various methods. However, the various methods make it inconvenience for the normal operation of the network game. As revealed by investigation, more than 65% of users have the experience of being stolen of the service account registered at an application server. The security problem of the service account becomes a nightmare to both the network game operators and the users.

Currently, there are mainly two methods for protecting the service account of the user: a first method of mobile phone protection and a second method of dynamic authentication.

In the first method, when the user logs on the application server, the application server generates a dynamic password and sends the dynamic password to the mobile phone of the user through a Short Message Service (SMS) gateway of a network operator according to a mobile phone number registered by the user. After receiving the dynamic password, the user logs on the application server using the dynamic password together with a static password (Personal Identification Number, PIN). In the first method, since nobody except for the user can obtain the dynamic password, an illegal user cannot log on the application server by stealing the password of the user.

The second method involves two devices to implement authentication of the user. One is an authentication server for authenticating identity of the user. The other is a password card for generating a dynamic password for the user. The authentication server and the password card have been installed with the same password generation software and an identification code uniquely identifying the user. When the user gets the password card, the identification code is loaded to the password card. Simultaneously, the identification code is installed in a user information table in a database of the application server. The user also has a PIN remembered by his/her own. When the user logs on the application server and enters the PIN, the password card generates a dynamic password uniquely corresponding to the password card every minute, which is unpredictable. The password card sends the service account, the PIN and the dynamic password to the application server. The application server determines the legality and authenticity of the user according to the dynamic password. Since the dynamic password is generated by the password card dynamically, nobody except for the legal user can obtain the password card and generate the correct dynamic password. Therefore, the dynamic password is immune from being peeked and wiretapped. Accordingly, the second method may avoid re-sending attack and is of high security and convenience.

In the two methods for protecting the service account of the user, the first method has a relatively high limitation to the service account. The dynamic password is required to be sent to the user via short message each time, and then the user enters the password received from the short message. It has a high time delay and wastes radio resources. In the second method, the protection is limited to the service account of a single service provider. Furthermore, when using the service, the user needs to buy an additional hardware, which baffles the competition of the application.

SUMMARY OF THE INVENTION

Embodiments of the present invention provide methods and systems for protecting a service account, apparatuses for storing a Personal Communication Profile (PCP) and application servers, to protect a service account of a user conveniently.

According to one aspect of the present invention, a method for protecting a service account includes:
  authenticating association information when a user logs on an application server with a service account through User Equipment (UE); if the authentication succeeds, allowing the user to log on the application server; otherwise, rejecting the user from logging on the application server;
  wherein the association information is configured for the service account of the user in a Personal Communication Profile (PCP) of the user at a network side.

According to another aspect of the present invention, a system for protecting a service account includes:
  User Equipment (UE), adapted for sending a log-on request of a user;
  an application server, adapted for interacting with the PCP storage apparatus or the UE based on the log-on request, authenticating association information in a Personal Communication Profile (PCP) of the user, and allowing the user to log on the application server if the authentication succeeds;
  a PCP storage apparatus, adapted for storing the PCP of the user; wherein the PCP contains association information for the service account of the user.

According to another aspect of the present invention, a system for protecting a service account includes:
  User Equipment (UE), adapted for sending a log-on request of a user;
  an application server, adapted for sending association information and returning a log-on success message or log-on failure message to the UE;
  a PCP storage apparatus, adapted for authenticating the association information received from the application server and returning an authentication success message or an authentication failure message to the application server.

According to another aspect of the present invention, an apparatus for storing a Personal Communication Profile (PCP) of a user includes:
  a PCP database, adapted for storing a PCP of a user and association information for a service account of the user;

an authentication unit, adapted for receiving association information, determining whether the PCP database comprises association information consistent with the association information received; and returning an authentication success message or authentication failure message.

According to another aspect of the present invention, an application server for protecting a service account of a user includes: a log-on control unit and a communication unit; wherein the log-on control unit is adapted for receiving a log-on request through the communication unit; requesting association information based on PCP location information of the user contained in the log-on request, determining whether the association information received is consistent with the association information stored in the log-on control unit, sending a log-on success message or a log-on failure message through the communication unit.

In embodiments of the present invention, besides protecting the service account by a static password, the user can implement an enhanced protection for the service account without receiving the dynamic password through a short message, which dramatically reduces the time delay for the user to log-on the application server. Further, the user needs not to purchase the password card additionally. Therefore, the competitiveness of the application server is improved.

EMBODIMENTS OF THE INVENTION

Figure 1:
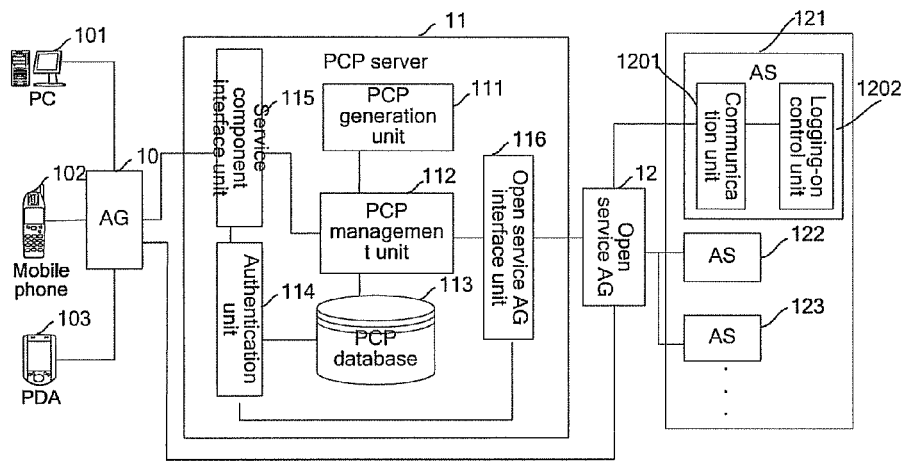
FIG. 1 is a schematic diagram illustrating connection relationships of a PCP server with a UE and an application server.

The present invention is hereinafter described in detail with reference to accompanying drawings and embodiments to further clarify the technical solutions and advantages of the present invention.

Unlike service providers, network operators possess network resources while the service providers do not. The network operators may provide basic access services for users and uniform access management, access authentication and service authentication for the users and the service providers. Therefore, the service account of the user may be protected by combining the authentication of the network operator with the service account of the service provider.

The network operator may provide a Personal Communication Profile (PCP) for the user through an access number of the user. The access number may be a mobile terminal number provided by a mobile operator, a telephone number provided by a fixed network operator or an access account provided by a broadband network operator. The PCP is a minimum complete set established by the network operator for the user and may uniquely identify the user. For example, the PCP may include service resource attribute information used by the user corresponding to the PCP. And the service resource attribute information may include bearer network resource attribute, upper-layer service capability component, platform and application software, etc.

In embodiments of the present invention, association information for the service account of the user is configured in the PCP of the user provided by the network operator. When the user logs on an application server with the service account, the association information in the PCP of the user is to be authenticated. If the authentication succeeds, the user is allowed to log on the application server; otherwise, the user is rejected.

The authentication of the service account may be performed by the application server. Specifically, the application server determines whether the association information configured in the PCP of the user is consistent with the association information stored in the application server. If the association information in the PCP of the user is consistent with that stored in the application server, the authentication succeeds and the service account of the user is legal; otherwise, the authentication fails and the service account is illegal.

In embodiments of the present invention, the authentication of the association information may also be performed by a PCP relevant apparatus in the operator's network. In this case, the application server sends the association information stored in the application server to the PCP relevant apparatus, the PCP relevant apparatus determines whether the association information received from the application server is consistent with that stored in the PCP relevant apparatus, thereby determining whether the service account of the user is legal.

In embodiments of the present invention, there may be a plurality of service accounts corresponding to one service. The association information of the plurality of service accounts may be the same or not. In other words, the association information may uniquely corresponds to one service account, or corresponds to a plurality of service accounts which belong to the same service and have a common attribute such as an access number.

The association information may be an alias generated for the service account that the user registered. The alias is used as an association identifier for associating the service account and the PCP of the user. Hereinafter, the association identifier is taken as an example in embodiments of the present invention.

In embodiments of the present invention, the PCP of the user is stored in a PCP storage apparatus which is located in the operator's network. Specifically, the PCP storage apparatus may be a User Equipment (UE) profile server, a UE database or a PCP server; wherein the PCP server is also referred to as a PCP management unit.

In the operator's network, the address of the PCP storage apparatus may be known by the application server in advance, e.g., when there is only one PCP storage apparatus in the operator's network. The address of the PCP storage apparatus may also be notified to the application server when the user registers or logs on the application server.

Hereinafter the PCP server is taken as an example to illustrate a system structure according to an embodiment of the present invention. The PCP server and connection relationships of the PCP server with the UEs and the application server are shown in FIG. 1. In the system, Personal Computer (PC) 101, mobile phone 102 and Personal Digital Assistant (PDA) 103 are UEs. The PC 101, the mobile phone 102 and the PDA 103 have their respective PCP in the PCP server 11, and connect with the PCP server 11 through an Access Gateway (AG) 10.

Each of the UEs is configured to send a log-on request to the application server, and further configured to receive PCP location information from the PCP server 11 or receive association information from the PCP server 11, and send the PCP location information or the association information to the corresponding application server through the log-on request.

The PCP server 11 is configured to store the PCP of the user including the association information of the user; and further configured to send the association information to the application server in response to a request of the application server, or authenticate the association information received from the application server and return an authentication result to the application server.

The application server is configured to interact with the PCP server 11 according to the log-on request of the user, authenticate the association information in the PCP of the user, and determine a log-on result according to the authentication result. Specifically, the application server may send a request to the PCP server 11 according to the log-on request of the user requesting the association information of the user and authenticate the association information returned by the PCP server 11. The application server may also send the association information stored in the application server to the PCP server 11 according to the log-on request of the user. Or, the application server authenticates the association information contained in the log-on request of the user, and returns a log-on success or log-on failure message to the UE according to the authentication result.

The PCP server 11 may include a PCP generation unit 111, a PCP management control unit 112, a PCP database 113, an authentication unit 114, a service component interface unit 115 and an open service access gateway interface unit 116.

The PCP generation unit 111 is configured to manage the PCP of the user, generate, update and maintain the PCP according to commands from the PCP management control unit 112, and write the PCP generated, updated or maintained to the PCP database 113 through the PCP management control unit 112.

The PCP management control center 112 is a central component of the PCP server 11, it is configured to manage external applications and service interface components, and further configured to manage the generation and storage of the PCP.

The PCP database 113 is configured to store the PCP of the user. The PCP database 113 may include a plurality of dimensions of user data. In embodiments of the present invention, the user data may be the association information. The dimensions may be stored in the following format in the PCP database 113.

```
<?xml version="1.0" encoding="UTF-8"?>
<PCPML>
    <PCPHdr>
        <PCPId>)0x56DFEA24F13</PCPId>           // PCP identifier
        <UserId>493005100592800</UserId>        //user identifier
        ...
    </PCPHdr>
    <PCPBody>
        <dimension name="Base Information" typeId="1">   // other dimension
        ...
```

-continued

```
        </dimension>
        <dimension name="PIM" typeId="2">     // dimension of the service account
            <item id="PIM001" name="WOW" type="ACC">    // item of service account 1
                <Description> game name 1 </Description>   //description of the item
                <Meta>              //description of the type of the account
                    <Type         xmlns="syncml:metinf">application/Game.Account</Type>
                    <Format xmlns="syncml:metinf">b64</Format>
                </Meta>
                <ACL>   read=www.wow.com-346&write= www.wow.com-346</ACL>     //description of the Access Control List
                <Data><!-- Base64-coded data--></Data>
                                    // association identifier
            <item>
            ...
            <item id="PIM002" name="FWest" type="ACC">  //item of service account 2
                <Description> game name 2 </Description>   //description of the item
                <Meta>              //description of the type of the account
                    <Type         xmlns="syncml:metinf">application/Game.Account</Type>
                    <Format xmlns="syncml:metinf">b64</Format>
                </Meta>
                <ACL>read=www.163.com-123&write= www.163.com-123</ACL>
                                    //description of the Access Control List
                <Data><!-- Base64-coded data--></Data>
                                    // association identifier
            <item>
            ...
        </dimension>
        <dimension name="Communication facilities" typeId="3">
                                    // information of other dimensions
            ...
        </dimension>
        ...
    </PCPBody>
</PCPML>
```

The above storage format of the PCP is based on an Extensible Markup Language (XML). The XML file includes a Header part and a Body part.

The Header part includes public basic information such as a PCP identifier and a user identifier to identify the user and the PCP of the user.

The Body part includes values of all parameters related to the PCP of the user. A label <dimension> is used to contain all the parameter items of the dimension. For example, <dimension name="PIM" typeId="2"> denotes a dimension of the service account; wherein "name" indicates name of the dimension; "typeId" is an identifier of the dimension. Each parameter item in the dimension is identified by an <Item>. Each dimension may include a plurality of parameter items.

The <Item> may include the following parameters: id, denotes the name of the parameter item, and is a unique identifier of the parameter item in the dimension; Name, denotes the name of the parameter item; Type, denotes the type of the parameter item. Specifically, an <Item>, i.e., a parameter item of the dimension, is described by the following parameters: <Description>, denotes a description of the parameter item; <Meta>, denotes the type (Type) and the format (Format) of the parameter item; <ACL>, denotes an Access Control List of the parameter item; and <Data>, denotes a value of the parameter item. The <Meta> includes two items: <Type> denotes the type of the parameter item, and <Format>, denotes the format of the parameter item. In a description file, each parameter item may be provided with a default type. For example, if there is no <Meta> in the PCP data, the value of the parameter item is the default type. As described below, a service account is an Item.

```
<item id="PIM001" name="WOW" type="ACC">      // item of
service account 1
       <Description> game name 1 </Description>      //description
of the item
       <Meta>        // description of the type of the account
           <Type                    xmlns="syncml:metinf">
application/Game.Account</Type>
           <Format xmlns="syncml:metinf">b64</Format>
       </Meta>
       <ACL>   read=www.wow.com-346&write=
www.wow.com-346</ACL>            // description of the Access
Control List
       <Data><!-- Base64-coded data--></Data> // association
           identifier
    <item>
```

In the above description, "read=www.wow.com-346&write=www.wow.com-346" is the description of the application server, which adopts a format of the address of the application server. This indicates that only the request from this address is from the application server corresponding to the Item, and read and write functions may be performed for the following association identifier <!--Base64-coded data-->.

The authentication unit 114 authenticates the network resources and the service resources used by the user based on the PCP of the user; sends PCP location information of the user to the UE, receives a request from the application server requesting for the association identifier, obtains the association identifier from the PCP database 113 and sends the association identifier to the application server; or sends the association identifier in the PCP of the user to the UE; or receives the association identifier from the application server and authenticates whether the PCP database 113 includes an corresponding association identifier and returns the authentication result to the application server.

The service component interface unit 115 is used for communicatively connecting the PCP management control unit 112 and the authentication unit 114 with the UEs through the AG 10, and for communicatively connecting the PCP management control unit 112 and the authentication unit 114 with other network elements in the operator's network.

The open service access gateway interface unit 116 is used for communicatively connecting the PCP management control unit 112 and the authentication unit 114 with the application server through the open service gateway 12.

The application servers 121, 122, 123 . . . are communicatively connected with the PCP management control unit 112 respectively through the open service gateway 12.

Each of the application servers mainly includes a communication unit 1201 and a log-on control unit 1202.

The communication unit 1201 is used for communicatively connecting the log-on control unit 1202 with the UEs and the PCP server 11.

The log-on control unit 1202 is used for receiving the log-on request from the UE through the communication unit 1201, and authenticating the association identifier contained in the log-on request, determining a log-on result based on the authentication result and sending the log-on result to the UE through the communication unit 1201; or sending the corresponding association identifier stored in the log-on control unit 1202 to the PCP server 11 according to the PCP location information contained in the log-on request, receiving the authentication result returned by the PCP server 11, determining a log-on result based on the authentication result, and sending the log-on result to the UE through the communication unit 1201; or requesting the PCP server 11 for the corresponding association identifier based on the PCP location information contained in the log-on request, determining whether the association identifier is consistent with the association identifier stored in the log-on control unit 1202, determining a log-on result based on the authentication result, and sending the log-on result to the UE through the communication unit 1201.

Figure 2:
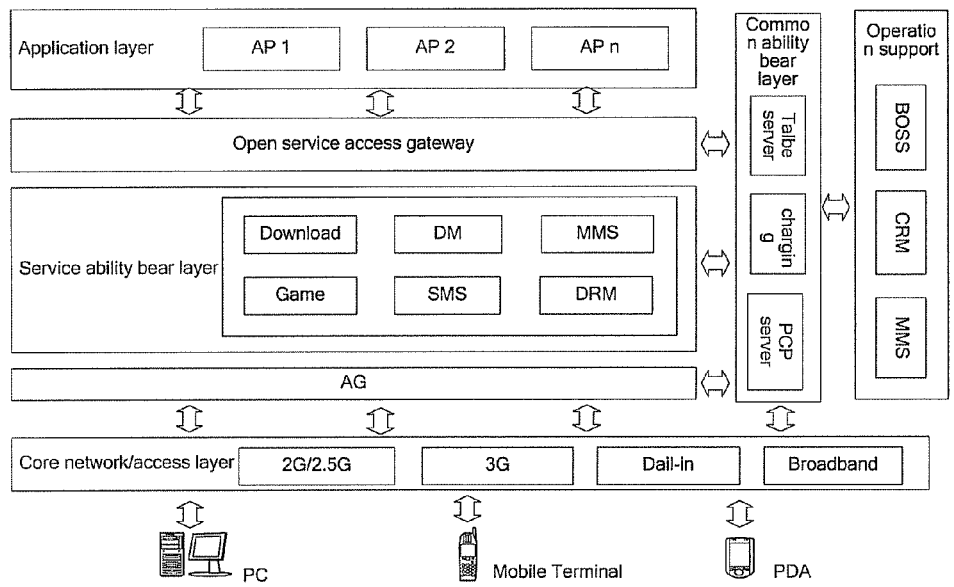
FIG. 2 is a schematic diagram illustrating location of the PCP server in the operator's network.

FIG. 1 is a schematic diagram illustrating a structure of a PCP server and connection relationships of the PCP server with the UE and the application server. The PCP server in the operator's network may be located in a common capability bear layer, as shown in FIG. 2. Other components of the network architecture, except the PCP server in the common capability bear layer, may be implemented according to the related art and will not be described herein.

The method of the present invention is hereinafter described in detail with reference to accompanying embodiments.

Figure 3:
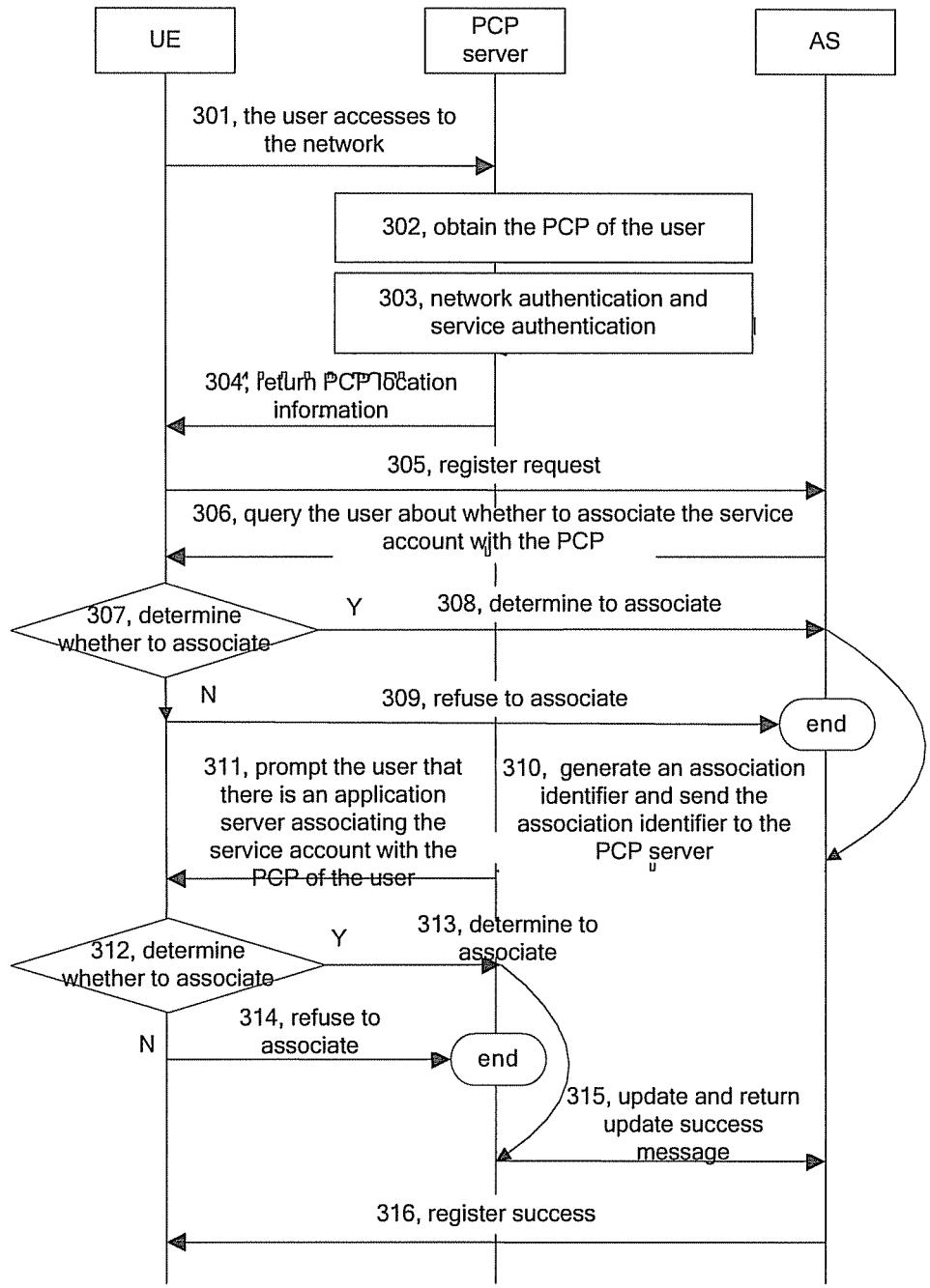
FIG. 3 is a flowchart illustrating a registration process of a service account according to an embodiment of the present invention.
Figure 4:
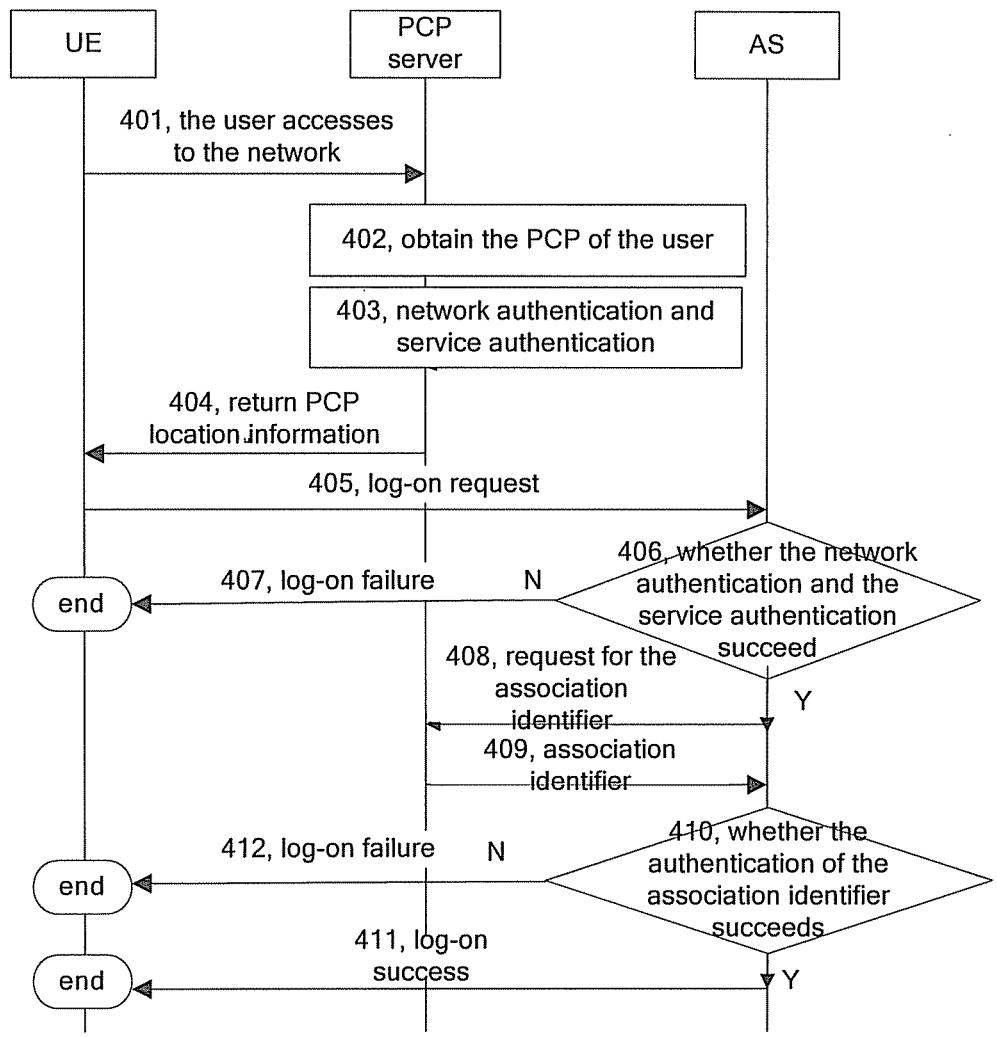
FIG. 4 is a flowchart illustrating a log-on process of the user at the application server according to an embodiment of the present invention.

A first embodiment of the present invention includes a registration process and a log-on process, respectively shown in FIG. 3 and FIG. 4.

The register process is shown in FIG. 3, it specifically includes.

Block 301: A user accesses the operator's network through a UE. In this block, the user may access the operator's network via a wireless or a fixed terminal.

Block 302: A PCP server in the operator's network obtains the PCP of the user according to an access identifier of the user.

In this block, the PCP server may search, according to the access identifier of the user, a PCP database for the PCP of the user. If the user accesses to the network for the first time and there is no PCP for the user, an initialization block may be further included. In the initialization block, the PCP server generates a PCP for the user.

Block 303: The PCP server performs network authentication and service authentication for the user.

The network authentication and the service authentication in this block means to authenticate information in the PCP of the user, may include authentication of network capability attribute and basic service capability in the PCP. The authentication of the network capability attribute includes: the network control layer authenticates, based on PCP relevant information of the user, the bearer capability of the user such as access bandwidth and Quality of Service. The authentication of the basic service capability refers to the authentication of the service capability of the user such as SMS, location service, etc., but not the authentication of a specific service. If the authentication succeeds, it indicates that the user can use the network normally. The implementations of the network authentication and the service authentication are similar to the related art. The difference is that, in the embodiments of the present invention, it is the PCP server that performs the authentication and the PCP of the user provides data for the network authentication and the service authentication.

Block 304: The PCP server sends PCP location information of the user to the UE. The PCP location information may be the address of the PCP server, such as a Uniform Resource Locator (URL) of the PCP server. The PCP server may further send an interaction mode, a certificate or other information to the UE for the authentication between the PCP server and the UE.

Block 305: The user sends a registration request to the application server when registering a service account at the application server. The location information of the PCP may be contained in the log-on request.

Block 306: After receiving the registration request, the application server sends a message to the user to query about whether to associate the service account of the user with the PCP of the user.

Block 307: After receiving the message, if the user determines to associate the service account with the PCP of the user, proceed to Block 308; otherwise, proceed to block 309.

Block 308: the user returns an acknowledgement to the application server. The PCP location information may also be sent to the application server in this block instead of block 305. If the PCP location information is sent to the application server in this block, proceed to block 310; otherwise, proceed to block 309.

Block 309: The user returns a refuse association message to the application server.

Block 310: The application server generates an association identifier for the user, stores the association identifier in the application server, and sends the association identifier to the PCP server according to the PCP location information through an association request message. The association request message further includes a user identifier or other information in the dimension.

Block 311: After receiving the association request message, the PCP server sends a prompt message to the UE to prompt the user that there is an application server requesting to associate the service account of the user with the PCP of the user. The prompt message includes information of the application server.

Block 312: After receiving the prompt request, if the user determines to associate the service account with the PCP, proceed to Block 313; otherwise, proceed to block 314.

Block 313: The user returns an acknowledgement to the PCP server and proceeds to block 315.

Block 314: The user returns a rejection message to the PCP server. The PCP server may further return a rejection message to the application server and the application server returns a register failure message to the UE.

Block 315: After receiving the acknowledgement from the UE, the PCP server adds the association identifier received from the application server into the PCP of the user and returns an update success message to the application server. In this block, the PCP server may also add other related information contained in the association request message into the corresponding item in the PCP of the user.

Block 316: After receiving the update success message, the application server returns a service account register success message to the user.

The log-on process of the user corresponding to this register process is shown in FIG. 4. Blocks 401 to 404 are similar to blocks 301 to 304 in FIG. 3, and Block 405 is performed after Block 404.

Because the PCP server has sent the PCP location information of the user to the UE during the register process, the UE may store the PCP location information. Therefore, in the log-on process, the PCP server may not send the PCP location information to the UE in block 404. Instead, the PCP server sends network authentication information and service authentication information to the UE.

Block 405: after the user inputs a log-on account and a password, the UE sends a log-on request to the application server containing the log-on account, the password and the PCP location information stored in the UE.

Block 406: The application server authenticates the legality of the log-on account and the password; if the authentication succeeds, proceed to block 408; otherwise, proceed to block 407.

Block 407: The application server returns a log-on failure message to the UE, wherein the log-on failure message may contain a failure reason.

Block 408: The application server sends a request message to the PCP server according to the PCP location information requesting the association identifier stored in the PCP of the user. The request message includes the user identifier and relevant information of the application server.

Block 409: After receiving the request message from the application server, the PCP server queries the database for the association identifier according to the user identifier and the relevant information of the application server; and returns the association identifier to the application server.

Block 410: The application server authenticates the association identifier returned by the PCP server; if the authentication succeeds, proceed to block 411; otherwise, proceed to block 412.

Block 411: The application server returns a log-on success message to the UE notifying the user that the log-on succeeds. And, the user may interact with the application server via the UE for a specific service.

Block 412: The application server returns a log-on failure message to the UE notifying the user that the log-on fails. The application server may further notify the user that the failure reason is that the authentication of the association identifier fails. The authentication of the association identifier is to determine whether the association identifier returned by the PCP server is consistent with the association identifier stored in the application server.

The above description illustrates a first embodiment of the present invention. As can be seen from the above description, in the first embodiment of the present invention, the UE only stores the PCP location information. And the application server requests for the association identifier of the user according to the PCP location information and authenticates the association identifier.

In embodiments of the present invention, the PCP of the user may also be stored in the UE. Accordingly, when performing the authentication, the UE directly sends the association identifier in the PCP to the corresponding application server. The application server authenticates the association identifier. The process is hereinafter described in detail with reference to a second embodiment of the present invention.

Figure 5:
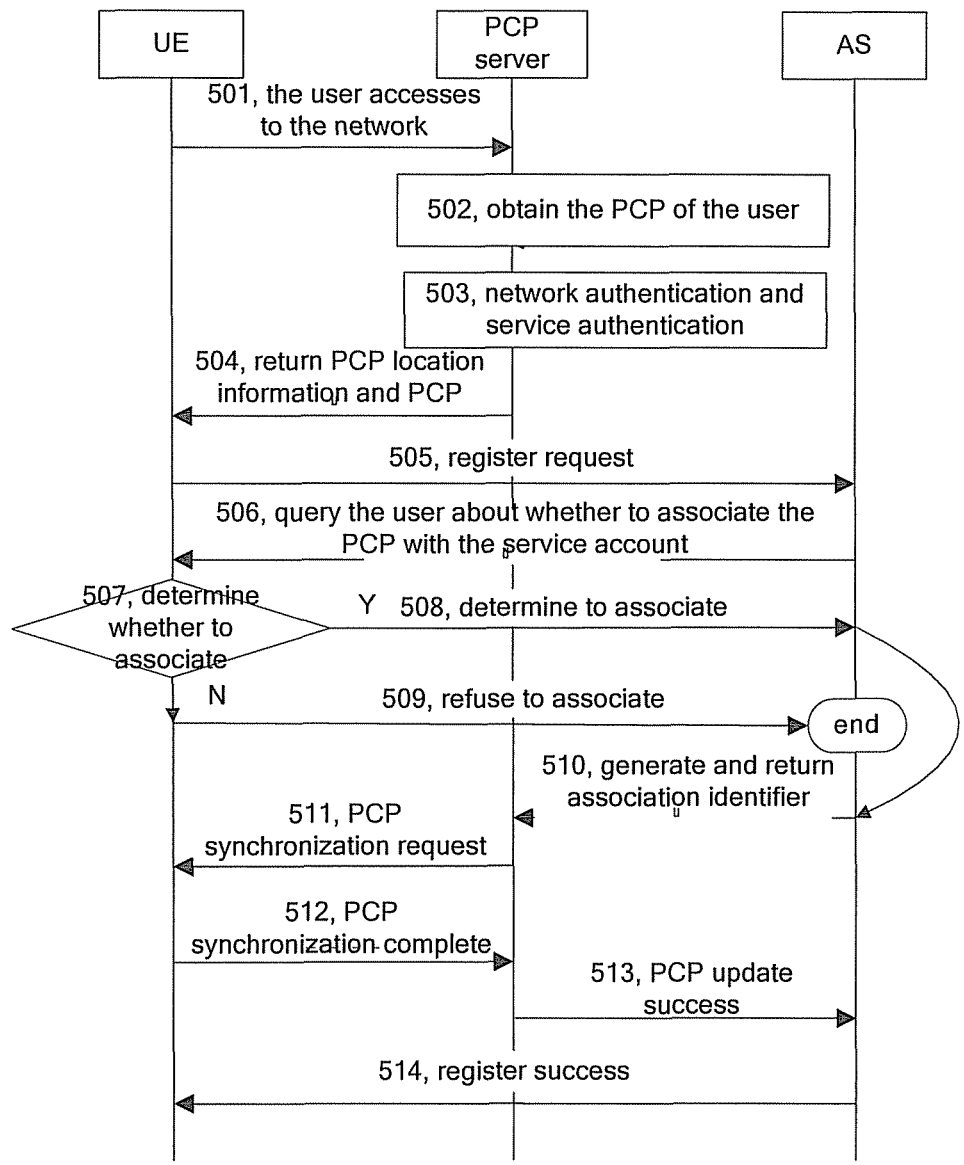
FIG. 5 is a flowchart illustrating a registration process of a service account according to an embodiment of the present invention.
Figure 6:
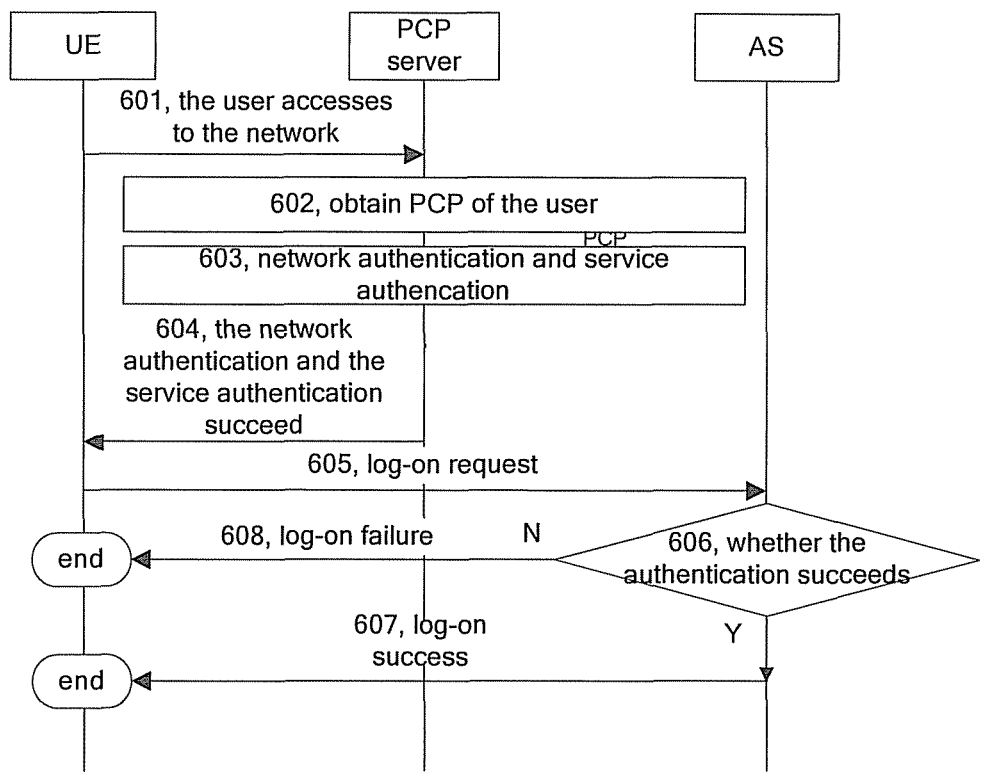
FIG. 6 is a flowchart illustrating a log-on process of the user at the application server according to an embodiment of the present invention.

The register process and the log-on process in the second embodiment of the present invention are respectively shown in FIGS. 5 and 6. Blocks 501 to 503 in the register process shown in FIG. 5 are similar to Blocks 301 to 303 in the first embodiment. After the authentication in Block 503 succeeds, proceed to block 504.

Block 504: The PCP server sends PCP location information and the PCP of the user to the UE. The UE stores the PCP location information and the PCP of the user. The content of the PCP may be part of association relevant information or all of the association relevant information.

Blocks 505 to 510 are similar to Blocks 305 to 310 and will not be repeated herein. In these blocks, the UE may send the PCP location information to the application server when sending the register request to the application server in Block 505. The UE may also carry the PCP location information of the user in the acknowledgement which is sent to the application server in block 508 in response to the query of whether to associate the PCP of the user with the service account.

Block 511: The PCP server updates the PCP of the user. Specifically, the PCP server adds the association identifier received from the application server to the PCP of the user, and sends a PCP synchronization update request to the UE; wherein the PCP synchronization update request contains the association identifier.

Block 512: After receiving the PCP synchronization update request, the UE adds the association identifier contained in the PCP synchronization update request to the PCP stored in the UE, and returns a PCP synchronization complete message to the PCP server.

Block 513: After receiving the PCP synchronization complete message, the PCP server returns an update success message to the application server.

Block 514 is similar to block 316 in FIG. 3.

Before block 511, i.e., before the PCP server updates the PCP of the user, there may be an additional block of query the user for determination, similar to FIG. 3. And receiving the determination from the user, update the PCP of the user. The detailed implementation after receiving the determination from the user is similar to blocks 311 to 314 in FIG. 3, which will not be repeated herein.

Accordingly, in the log-on process shown in FIG. 6, blocks 601 to 603 are similar to blocks 501 to 503 in FIG. 5.

Block 604: The PCP server returns an authentication success message to the UE.

Block 605: The UE sends to the application server a log-on request containing the service account, the PIN and the association identifier corresponding to the application server in the PCP.

Block 606: The application server authenticates the user according to the information received including authentication of the service account, the PIN and the association identifier. If the authentication succeeds, proceed to block 607; otherwise, proceed to block 608.

Block 607: The application server returns a log-on success message to the UE.

Block 608: The application server returns a log-on failure message to the UE.

In the above first and second embodiments, when the user logs on the application server, the application server authenticates the association identifier. In embodiments of the present invention, the authentication of the association identifier may also be performed by the PCP server, which will be described in detail with reference to a third embodiment hereinafter.

Figure 7:
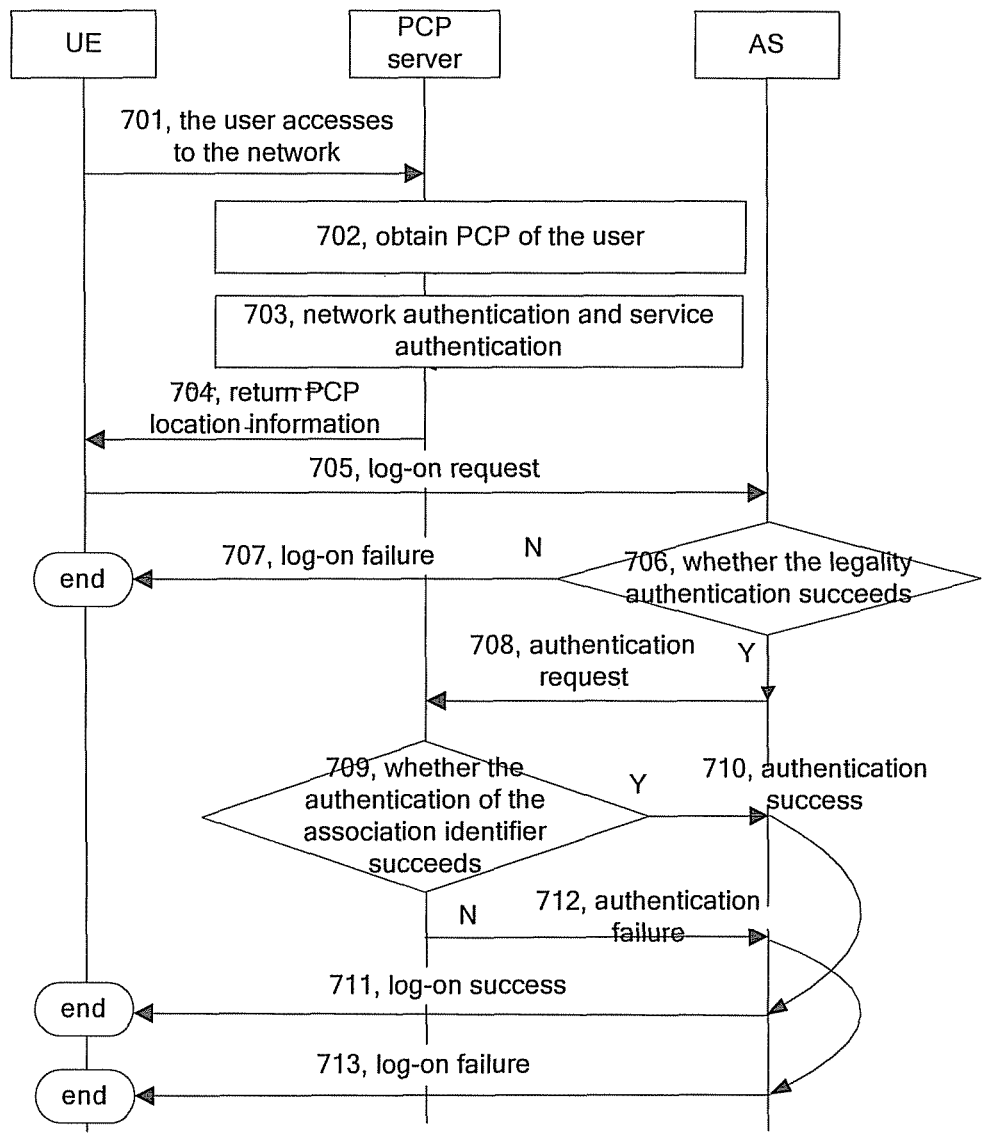
FIG. 7 is a flowchart illustrating a log-on process of the user at the application server according to an embodiment of the present invention.

The registration process of the third embodiment is similar to that of the first embodiment. The log-on process of the third embodiment is shown in FIG. 7. Blocks 701 to 707 are similar to blocks 401 to 407 in FIG. 4. In block 706, after the authentication of the service account and the PIN succeeds, proceed to block 708.

Block 708: The application server sends to the PCP server an authentication request containing the association identifier stored in the application server, the user identifier and the application server information.

Block 709: The PCP server searches the PCP of the user according to the user identifier and determines whether the PCP of the user contains an association identifier consistent with that contained in the authentication request. If the PCP of the user contains an association identifier consistent with that contained in the authentication request, the authentication succeeds, proceed to block 710; otherwise, the authentication fails, proceed to block 712.

Block 710: The PCP server returns an authentication success message to the application server.

Block 711: The application server returns a log-on success message to the UE.

Block 712: The PCP server returns an authentication failure message to the application server.

Block 713: The application server returns a log-on failure message to the UE.

In above first to third embodiments, the association identifier used for associating the PCP with the service account of the user is static. To further ensure the security of the association identifier, the association identifier may be constantly updated, i.e., generate the association identifier dynamically. A fourth embodiment of the present invention will be given to illustrate the protection of the service account by dynamic association identifier.

In the fourth embodiment, the registration process of the service account is similar to the above three embodiments. The log-on process of the fourth embodiment differs from the above three embodiments in that: after the application server returns the log-on success message to the UE notifying the user that the log-on using the service account succeeds, the application server deletes the association identifier corresponding to the service account, or sets the association identifier corresponding to the service account to be invalid. The application server generates a new association identifier used for authentication when next time the user logs on, and sends an update request to the PCP server requesting the PCP server to update the association identifier. After receiving the update request, the PCP server updates the association identifier corresponding to the application server, and returns an update success message to the application server.

If the PCP of the user is stored in the UE, the PCP server or the application server is further required to send the new association identifier to the UE. The UE updates the association identifier stored in the UE. The application server may send the new association identifier to the PCP server and the UE simultaneously. Then the PCP server and the UE update the association identifier respectively. The application server may also only send the new association identifier to the UE. Then the UE notifies the PCP server to update the association identifier corresponding to the application server.

In the fourth embodiment, the update of the association identifier is triggered by a log-on success event. In embodiments of the present invention, the update of the association identifier may also be triggered by other events, e.g., an update request event sent by the user after receiving the log-on success message. In addition, in embodiments of the present invention, the update of the association identifier may be performed through the following two schemes.

The first scheme is a time triggered update scheme. In the first scheme, an update time or lifetime for the association identifier is set in advance. When the update time arrives or the lifetime expires, the application server triggers the update of the association identifier, and updates the association identifier in the PCP server or update the association identifier in both the PCP server and the UE. The detailed update is similar to that described in the fourth embodiment and will not be repeated herein. The association identifiers corresponding to different services may be set with different priorities. Accordingly, the update time and the lifetime of the association identifier may be set to different values according to the priority of the association identifier. For example, the higher the priority of the association identifier is, the shorter the update time and the lifetime of the association identifier are. The lower the priority of the association identifier is, the longer the update time and the lifetime of the association identifier are.

The second scheme is a combined time-and-event triggered update scheme. The second scheme combines the time-triggered scheme and an event-triggered scheme. For example, after the update time arrives or the lifetime expires, update the association identifier, and record the time of the update. After an event such as the user successfully logs on or the application server receives the update request from the UE happens, determine whether the time interval between the latest update and the current time exceeds a minimum update period. If the time interval exceeds the minimum update period, update the association identifier; otherwise, do not update the association identifier. In practical applications, other time and events may also be the trigger for the update of the association identifier, which will not be described herein.

The above description is the preferred embodiments of the present invention and is not for use in limiting the protection scope thereof. All the modifications, equivalent replacements or improvements in the scope of the present invention shall be included in the protection scope of the present invention.

What is claimed is:

1. A method for protecting a service account, comprising:
generating, by a hardware application server, association information corresponding to a service account, when a user registers the service account at the application server; wherein the association information further comprises an association identifier for associating the service account with a Personal Communication Profile (PCP) of the user;
sending, by the application server, the generated association identifier to a PCP storage apparatus to add the association identifier into the PCP of the user;
receiving, by the application server, a log-on request carrying a log-on account and a password sent from a User Equipment (UE) of a user;
authenticating, by the application server, legality of the log-on account and the password;
sending, by the application server, an authentication request containing the association information for a service account of the user stored in the application server and a user identifier to the PCP storage apparatus if the log-on account and the password are legal;
searching, by the PCP storage apparatus, the PCP of the user according to the user identifier, and determining whether the PCP of the user comprises association information consistent with the association information for the service account received from the application server to obtain an authentication determination result; and returning the authentication determination result to the application server;
wherein the association information contained in the PCP of the user, stored in the PCP storage apparatus, corresponds to a plurality of service accounts of the user used on a plurality of application servers.

2. The method of claim 1, further comprising:
generating, by the application server, new association information, sending the new association information to the PCP storage apparatus, and requesting the PCP storage apparatus to update the association information;
updating, by the PCP storage apparatus, the association information with the new association information;
wherein the application server generates the new association information in any one of the following cases: after the application server allows the user to log on; after the user successfully logs on and the application server receives an update request from the user; after a timer for updating the association information expires; after a lifetime of the association information expires; after the user successfully logs on and the application server receives an update request from the user and a time interval between the time when the application server receives the update request and the time of last updating is longer than a minimum updating period.

3. The method of claim 1, further comprising:
sending, by the PCP storage apparatus before storing the association information to the PCP of the user, a prompt message to the UE to prompt the user whether to associate the service account of the user with the PCP of the user;
receiving, by PCP storage apparatus, an acknowledgement from the UE.

4. The method of claim 1, further comprising:
sending, by the application server, a query message to the UE to query the user whether to associate the service account of the user with the PCP of the user;
receiving, by the application server, an acknowledgement from the UE.

5. The method of claim 1, further comprising:
sending, by the PCP storage apparatus, PCP location information of the user to the UE;
sending, by the UE, the PCP location information to the application server when logging on the application server with the service account; and
interacting, by the application server, with the PCP storage apparatus according to the PCP location information of the user.

6. A system for protecting a service account of a user, comprising:
a hardware application server for receiving a log-on request carrying a log-on account and a password of a user, authenticating legality of the log-on account and the password, sending an authentication request containing association information for a service account of the user stored in the application server and a user identifier to a Personal Communication Profile, PCP, storage apparatus if the log-on account and the password are legal and returning a log-on success message or log-on failure message to the UE;
wherein the application server generates and stores the association information corresponding to a service account after receiving a registration request from the UE, and sends the generated association information to the PCP storage apparatus;
wherein the association information further comprises an association identifier for associating the service account with the PCP of the user;
a PCP storage apparatus for adding the generated association identifier received from the application server into the PCP of the user, searching the PCP of the user according to the user identifier in the authentication request, determining whether PCP of the user comprises association information consistent with the association information for the service account received from the application server to obtain an authentication determination result, and returning an determination authentication success message or an determination authentication failure message to the application server;
wherein the association information contained in the PCP of the user, stored in the PCP storage apparatus, corresponds to a plurality of service accounts of the user used on a plurality of application servers.

7. The system of claim 6, wherein the application server is further for deleting the association information stored in the application server or setting the association information as invalid after the authentication succeeds, generating new association information for the service account of the user, and sending the new association information to the PCP storage apparatus;
    the PCP storage apparatus is further for updating the association information stored in the PCP storage apparatus according to the new association information received from the application server, and returning an update success message to the application server.

\* \* \* \* \*